United States Patent

Hasegawa et al.

[11] Patent Number: 5,891,586
[45] Date of Patent: *Apr. 6, 1999

[54] MULTILAYER THIN-FILM FOR MAGNETORESISTIVE DEVICE

[75] Inventors: Naoya Hasegawa; Fumihito Koike, both of Niigata-ken, Japan

[73] Assignee: Alps Electric Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 585,584

[22] Filed: Jan. 16, 1996

[30] Foreign Application Priority Data

Jan. 27, 1995 [JP] Japan .................................. 7-012057

[51] Int. Cl.$^6$ ...................................................... B32B 15/00
[52] U.S. Cl. .......................... 428/668; 428/611; 428/672; 428/673; 428/675; 428/692; 428/680; 428/928
[58] Field of Search .................................... 428/611, 928, 428/668, 692, 680, 672, 673, 675

[56] References Cited

U.S. PATENT DOCUMENTS

| | | | |
|---|---|---|---|
| 4,766,039 | 8/1988 | Otomo et al. ........................... | 428/469 |
| 5,091,266 | 2/1992 | Omata ..................................... | 428/692 |
| 5,108,837 | 4/1992 | Mallary ................................... | 428/336 |
| 5,159,513 | 10/1992 | Dieny et al. ............................. | 360/113 |
| 5,534,355 | 7/1996 | Okuno et al. ........................... | 428/611 |
| 5,556,718 | 9/1996 | Motomura et al. .................. | 428/694 R |
| 5,569,544 | 10/1996 | Daughton ................................ | 428/611 |
| 5,595,830 | 1/1997 | Daughton ................................ | 428/611 |
| 5,695,864 | 12/1997 | Slonczewski .......................... | 428/212 |
| 5,698,335 | 12/1997 | Iwasaki et al. ........................ | 428/611 |

*Primary Examiner*—Nam Nguyen
*Assistant Examiner*—Steven H. VerSteeg
*Attorney, Agent, or Firm*—Brinks Hofer Gilson & Lione

[57] ABSTRACT

A multilayer thin-film structure comprises at least one layered structure formed by depositing a nonmagnetic layer, a first ferromagnetic layer of a ferromagnetic metal or alloy having a positive saturation magnetostriction constant, a nonmagnetic layer and a ferromagnetic layer of a ferromagnetic metal or alloy having a negative saturation magnetostriction constant in that order, and a uniaxial stress is induced in the multilayer thin-film structure. The multilayer thin-film structure for magnetoresistive devices, comprises the magnetic layers which could not have been used for forming the prior art structures and having similar compositions which could not have been used for forming the prior art structure, has an MR ratio in the range of 10 to 20%, does not need the use of antiferromagnetic materials unsatisfactory in corrosion resistance and environment resistance, does not require the turning of a magnetic field when forming the thin films and does not require expensive manufacturing systems.

12 Claims, 11 Drawing Sheets

$$\frac{3}{2} \lambda_2 \cdot \sigma < K_u$$

$$Ku < \frac{3}{2} \lambda_2 \cdot \sigma < \frac{H_{UA} \cdot M_S}{2}$$

$$\frac{3}{2} \lambda_2 \cdot \sigma > \frac{H_{UA} \cdot M_S}{2}$$

MULTILAYER THIN-FILM FOR MAGNETORESISTIVE DEVICE

BACKGROUND OF THE INVENTION

1. Field of the Invention

The present invention relates to a multilayer thin-film structure for a magnetoresistive device employed in magnetic heads, position sensors, rotation sensors and the like.

2. Description of the Related Art

An NiFe alloy (Permalloy) is a known magnetoresistive (MR) material which has been used for forming multilayer thin-film structures for MR devices. Generally, the percentage change in resistance of a Permalloy thin film is in the range of 2 to 3%. Accordingly, magnetoresistive thin films having magnetoresistive ratios (MR ratios) greater than that of Permalloy have been desired to cope with increase in linear density and track density in magnetic recording or increase in the resolving power of magnetic sensors.

Recently, a phenomenon called giant magnetoresistive effect has been found in a multilayer thin-film structure, such as a multilayer thin-film structure consisting of alternate layers of Fe thin films and Cr thin films or alternate layers of Co thin films and Cu thin films. In such a multilayer thin-film structure, the magnetizations of the ferromagnetic layers of Fe or Co interact magnetically through the nonmagnetic layers of Cr or Cu and the magnetizations of the stacked ferromagnetic layers are coupled to maintain an antiparallel alignment; that is, in this multilayer thin-film structure, the direction of magnetizations of the ferromagnetic layers spaced alternately with the nonmagnetic layers are opposite to each other. When an appropriate external magnetic field is applied to such a structure, the magnetization directions of the ferromagnetic layers are aligned in a direction.

In this multilayer thin-film structure, it is known that the state where the magnetizations of the ferromagnetic layers are in an antiparallel alignment and the state where the magnetizations of the ferromagnetic layers are in a parallel alignment differ from each other in the scattering mode of conduction electrons in the interface between the ferromagnetic Fe layers and the nonmagnetic Cr layers or between the ferromagnetic Co layers and the nonmagnetic Cu layers. Consequently, the electric resistance is high when the magnetization directions of the ferromagnetic layers are in an antiparallel alignment, the electric resistance is low when the magnetization directions of the ferromagnetic layers are in a parallel alignment, which produces the so-called giant magnetoresistive effect causing a resistance change at a high percentage ratio greater than that of resistance change in a Permalloy film. Thus, these multilayer thin-film structures have an MR producing mechanism basically different from that of the conventional single NiFe film.

However, since the magnetic interaction between the ferromagnetic layers of those multilayer thin-film structures that acts in an effort to set the magnetizations of the ferromagnetic layers in an antiparallel alignment is excessively strong, a very intense external magnetic field must be applied to those multilayer thin-film structures to set the magnetization directions of the ferromagnetic layers in a parallel alignment. Therefore, a large resistance change cannot be expected unless a very intense magnetic field is applied to the multilayer thin-film structures, and hence magnetic heads that detect an applied magnetic field of a very low intensity created by a magnetic recording medium are unable to function with satisfactorily high sensitivity when such a multilayer thin-film structure is incorporated into those magnetic heads.

It may be effective, for solving such problems, to determine the thickness of the nonmagnetic layers of Cr or Cu so that the magnetic interaction between the ferromagnetic layers are not excessively strong and to control the relative magnetization directions of the ferromagnetic layers by another means other than the magnetic interaction.

A technique proposed to control the relative magnetization directions of the ferromagnetic layers employs an antiferromagnetic layer, such as an FeMn layer, to fix the magnetization direction of one of the ferromagnetic layers so that the magnetization direction of the same ferromagnetic layer may not be changed by an external magnetic field, and to allow the magnetization direction of the other ferromagnetic layer to change to enable the multilayer thin-film structure to be operated by an applied magnetic field of a very low intensity.

Referring to FIG. 17 showing an MR sensor A disclosed in U.S. Pat. No. 5,159,513 employing the foregoing technique, the MR sensor A is formed by depositing a first magnetic layer 2, a nonmagnetic layer 3, a second magnetic layer 4 and an antiferromagnetic layer 5 on a nonmagnetic substrate 1. The magnetization direction B of the second magnetic layer 4 is fixed by the magnetic exchange coupling effect of the antiferromagnetic layer 5, the magnetization direction C of the first magnetic layer 2 is kept perpendicular to the magnetization direction B of the second magnetic layer 4 in the absence of an applied magnetic field. Since the magnetization direction C of the first magnetic layer 2 is not fixed, the magnetization direction C can be rotated by an applied external magnetic field. When a magnetic field h is applied to the MR sensor of FIG. 17, the magnetization direction C of the first magnetic layer 2 rotates as indicated by the arrows according to the direction of the applied magnetic field h and, consequently, the first magnetic layer 2 and the second magnetic layer 4 become different from each other in magnetization rotation causing resistance change that enable the detection of the applied magnetic field.

Another MR sensor B shown in FIG. 18 has one magnetic layer having a fixed magnetization direction and one magnetic layer having a free magnetization direction. As shown in FIG. 18, the MR sensor B is formed by sequentially depositing an antiferromagnetic layer 7 of NiO, a magnetic layer 8 of an NiFe alloy, a nonmagnetic layer 9 of Cu, a magnetic layer 10 of an NiFe, a nonmagnetic layer 11 of Cu, a magnetic layer 12 of an NiFe alloy and an antiferromagnetic layer 13 of an FeMn alloy in that order on a substrate 6. The antiferromagnetic layers 7 and 13 fix the magnetization directions of the adjacent ferromagnetic layers 8 and 12, and the magnetization direction of the ferromagnetic layer 10 sandwiched between the nonmagnetic layers 9 and 11 and disposed between the ferromagnetic layers 8 and 12 rotates according to the direction of an applied external magnetic field.

In the MR sensor of FIG. 17 (FIG. 18), the resistance of the first magnetic layer 2 (the magnetic layer 10) varies linearly in a satisfactory linearity with the variation of the applied magnetic field of a very low intensity and hence the MR sensor is able to measure the applied magnetic field of intensity varying in a wide range. When the first magnetic layer 2 is formed of a soft magnetic material, such as an NiFe alloy, the highly permeable axis of hard direction of magnetization of the soft magnetic material can be used as the magnetization direction and the degree of hysteresis is small.

However, since the MR sensor of FIG. 17 or the MR sensor of FIG. 18 fix the magnetization direction of the second magnetic layer 4 adjacent to the antiferromagnetic layer 5 of FeMn or the magnetization directions of the ferromagnetic layers 8 and 12 by the antiferromagnetic layer 7 of NiO underlying the ferromagnetic layer 8 and the antiferromagnetic layer 13 of an NiFe alloy overlying the ferromagnetic layer 12 and keeps the magnetization direction of the intermediate magnetic layer 10 free, the number of the interfaces between the NiFe alloy layer (magnetic layer) and the Cu layer (nonmagnetic layer), which contributes to giant magnetoresistive effect, cannot be increased, which is a significant restriction on the magnitude of the MR ratio. Accordingly, the MR sensors of the structures shown in FIGS. 17 and 18 are utterly unable to achieve MR ratios on the order of 10 to 20%. The material forming the antiferromagnetic layers 5 and 7, i.e., FeMn, is not advantageous in corrosion resistance and environment resistance.

Furthermore, when forming the layers respectively having spontaneous magnetization directions, i.e., the directions of axes of easy magnetization of magnetic anisotropy, oriented at an angle of 90° with respect to each other in a vacuum chamber in fabricating the MR sensor shown in FIG. 17 or 18, the applied magnetic field must be turned for each layer, which requires a film forming apparatus of a complex construction capable of turning the applied magnetic field and hence increases equipment costs.

Another previously proposed structure capable of controlling relative magnetization direction is formed by alternately depositing a plurality of ferromagnetic layers in which the reversion of magnetization by an external magnetic field is difficult, such as Co layers, and a plurality of ferromagnetic layers having a small coercive force and a soft magnetism, such as an NiFe alloy layers, with nonmagnetic layers, such as Cu layers, interposed therebetween.

FIG. 19 shows an MR device D developed by the application of such a technique, mentioned in Journal of the Magnetics Society of Japan, Vol. 15, No. 2, pp. 431–436 (1991). This MR device D is formed by stacking, on a substrate 15, a plurality of layered structures each formed by sequentially depositing a nonmagnetic layer 16 of Cu, a magnetic layer 17 of an NiFe alloy having a low coercive force, a nonmagnetic layer 18 of Cu, a magnetic layer 19 of Co having a high coercive force, a nonmagnetic layer 20 of Cu, a magnetic layer 21 of an NiFe alloy of a low coercive force, a nonmagnetic layer 22 of Cu and a magnetic layer 23 of Co of a high coercive force.

In the MR device of FIG. 19, since the magnetization directions of the magnetic layers 19 and 23 having a high coercive force are difficult to change by an external magnetic field, and the magnetization directions of the magnetic layers 17 and 21 having a low coercive force are easy to reverse, it is possible to change over from one of an antiferromagnetic state, i.e., a state of antiparallel magnetization where the resistivity is large, and a ferromagnetic state, i.e., a state of parallel magnetization where the resistivity is small, to the other by an applied magnetic field of a low intensity. Therefore, the number of the magnetic layers can be increased and layers of materials having problems in environment resistance, such as FeMn, need not be used. However, the MR device of FIG. 19 has the following problems.

An NiFe alloy forming the magnetic layers of a low coercive force and Co forming the magnetic layers of a high coercive force are utterly dissimilar substances, conduction electrons receive different potentials from those magnetic layers and spin-dependent electron scattering that contribute to giant magnetoresistive effect increases in the interfaces. Therefore the MR ratio cannot be increased very much.

Since the magnetocrystalline anisotropy of Co forming the high-permeability magnetic layers is large, it is difficult to control induced magnetic anisotropy when forming the Co magnetic layers in a magnetic field and to form the Co magnetic layers in uniform uniaxial magnetic anisotropy, and the complete design of a layered structure having layers having axes of spontaneous magnetization oriented at an angle of 90° with respect to each other like the structure shown in FIG. 17 or 18; that is, it is difficult to magnetize the layers having magnetization directions oriented at an angle of 90° with respect to each other by the control of magnetization using the difference in coercive force between the magnetic layer of a high coercive force and the magnetic layer of a low coercive force. Accordingly, the upper limit of the MR ratio of the MR device of FIG. 19 is on the order of 10%.

SUMMARY OF THE INVENTION

The present invention has been made in view of the foregoing problems in the prior art and it is therefore an object of the present invention to provide a multilayer thin-film structure for magnetoresistive devices, comprising magnetic layers which could not have been used for forming the prior art structures shown in FIGS. 17 and 18 and having similar compositions which could not have been used for forming the prior art structure shown in FIG. 19, having an MR ratio in the range of 10 to 20%, not needing the use of antiferromagnetic materials unsatisfactory in corrosion resistance and environment resistance, not requiring the turning of a magnetic field when forming the thin films and not requiring expensive manufacturing systems.

Another object of the present invention is to provide a method of adjusting the magnetization of magnetic layers.

According to a first aspect of the present invention, a multilayer thin-film structure comprises at least one layered structure formed by depositing a nonmagnetic layer, a ferromagnetic layers of a ferromagnetic metal or alloy having a positive saturation magnetostriction constant, a nonmagnetic layer and ferromagnetic layers of a ferromagnetic metal or alloy having a negative saturation magnetostriction constant in that order, and a uniaxial stress is induced in the multilayer thin-film structure. Both the ferromagnetic layers spaced by the nonmagnetic layer have uniaxial magnetic anisotropy, the respective axes of easy magnetization of those ferromagnetic layers in a plane parallel to the layers are substantially perpendicular to each other, the absolute value of the uniaxial anisotropy energy of one of those ferromagnetic layers is 500 J/m³ or above and that of the other ferromagnetic layer is, preferably, in the range of 50 to 500 J/m³.

According to a second aspect of the present invention, a multilayer thin-film structure comprises at least one layered structure formed by alternately depositing ferromagnetic layers of a ferromagnetic metal or alloy having a saturation magnetostriction constant less than $2 \times 10^{-6}$ in absolute value, and ferromagnetic layers of a ferromagnetic metal or alloy having a saturation magnetostriction constant of $2 \times 10^{-6}$ or above with nonmagnetic layers interposed therebetween, and a uniaxial stress is induced in the multilayer thin-film structure. Both the ferromagnetic layers spaced by the nonmagnetic layer have uniaxial magnetic anisotropy, the respective axes of easy magnetization of those ferromagnetic layers in a plane parallel to the layers are substantially perpendicular to each other, the uniaxial magnetic anisotropy of the ferromagnetic layers is controlled during magnetic field film formation or during magnetic field heat treatment, the absolute value of the uniaxial anisotropy energy of one of those ferromagnetic layers is in the range of 50 to 500 J/m$^3$ and that of the other ferromagnetic layer is controlled by the magnetoelastic effect of magnetostriction and stress and is 500 J/m$^3$ or above.

In the multilayer thin-film structures in the first and the second aspect of the present invention, the ferromagnetic layers are formed of an alloy expressed by $Ni_{100-x}Fe_x$ or $Ni_{100-x-y}Fe_xCo_y$, the composition of one of the two types of ferromagnetic layers meets inequalities: $0 \leq x \leq 20$ (at. %) and $0 \leq y \leq 60$ (at. %) and that of the other type of ferromagnetic layers meets inequalities: $7 \leq x \leq 60$ and $0 \leq y \leq 60$ (at. %).

According to a third aspect of the present invention, a multilayer thin-film structure comprises a reference ferromagnetic layer, an antiferromagnetic layer formed on one surface of the reference ferromagnetic layer to pin the magnetization of the reference ferromagnetic layer by establishing a single domain, a nonmagnetic layer formed on the other surface of the reference ferromagnetic layer, and a free ferromagnetic layer formed on the nonmagnetic layer. The direction of spontaneous magnetization of the free ferromagnetic layer is controlled so as to be perpendicular to the magnetization direction of the reference ferromagnetic layer by the magnetoelastic effect produced by the magnetostriction of the free ferromagnetic layer and a uniaxial stress induced in the multilayer thin-film structure.

Uniaxial anisotropy energy produced in the free ferromagnetic layer by the magnetostriction of the free ferromagnetic layer and the uniaxial stress induced in the multilayer thin-film structure may be greater than the uniaxial anisotropy energy produced in the free ferromagnetic layer during magnetic field film formation and smaller than the anisotropy energy produced in the reference ferromagnetic layer by the antiferromagnetic layer.

The uniaxial stress induced in the multilayer thin-film structure may be induced by a substrate on which the multilayer thin-film structure is formed, a protective film formed on the multilayer thin-film structure or a layer insulating layer, or by machining. Any one of the nonmagnetic layers may be formed of Cu, Ag, Au or an alloy of at least two of those elements.

According to a fourth aspect of the present invention, a method of adjusting the magnetizations of magnetic layers forms a multilayer thin-film structure by alternately depositing ferromagnetic layers of a ferromagnetic metal or alloy having a positive saturation magnetostriction constant, and ferromagnetic layers of a ferromagnetic metal or alloy having a negative saturation magnetostriction constant with nonmagnetic layers interposed therebetween, and induces a uniaxial stress in the multilayer thin-film structure to set the respective directions of spontaneous magnetization of those ferromagnetic layers perpendicular to each other.

According to a fifth aspect of the present invention, a method of adjusting the magnetizations of magnetic layers forms a multilayer thin-film structure by alternately depositing ferromagnetic layers of a ferromagnetic metal or alloy having a saturation magnetostriction constant less than $2 \times 10^{-6}$ in absolute value, and ferromagnetic layers of a ferromagnetic metal or alloy having a saturation magnetostriction constant of $2 \times 10^{-6}$ or above in absolute value with nonmagnetic layers interposed therebetween, and induces a uniaxial stress in the multilayer thin-film structure to set the respective directions of spontaneous magnetization of those ferromagnetic layers perpendicular to each other.

According to a sixth aspect of the present invention, a method of adjusting the magnetizations of magnetic layers forms a multilayer thin-film structure by sequentially depositing an antiferromagnetic layer, a reference ferromagnetic layer, a nonmagnetic layer and a free ferromagnetic layer, establishes a single domain in the reference ferromagnetic layer by the antiferromagnetic layer, and controls the direction of spontaneous magnetization of the free ferromagnetic layer so as to be perpendicular to the magnetization direction of the reference ferromagnetic layer by the magnetoelastic effect produced by inducing a uniaxial stress in the multilayer thin-film structure.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

According to a first aspect of the present invention, a multilayer thin-film structure comprises at least one layered structure formed by alternately depositing first ferromagnetic layers of a ferromagnetic metal or alloy having a positive saturation magnetostriction constant, and second ferromagnetic layers of a ferromagnetic metal or alloy having a negative saturation magnetostriction constant with nonmagnetic layers interposed therebetween, and a uniaxial stress is induced in the multilayer thin-film structure to orient the respective directions of spontaneous magnetization of the first and the second ferromagnetic layer on the opposite sides of the nonmagnetic layer substantially perpendicularly to each other. Thus, the first and the second ferromagnetic layer spaced by the nonmagnetic layer have the directions of spontaneous magnetization perpendicular to each other, respectively.

When an external magnetic field of the same direction as that of the spontaneous magnetization of either the first or the second ferromagnetic layers is applied to the multilayer thin-film structure, the respective magnetization directions of the first and the second ferromagnetic layers on the opposite sides of the nonmagnetic layers are set in parallel to each other, so that the resistivity of the multilayer thin-film structure decreases.

When an external magnetic field of a direction opposite to that of the spontaneous magnetization of either the first or the second ferromagnetic layers is applied to the multilayer thin-film structure, the magnetization direction of either the first or the second ferromagnetic layers is not changed and the magnetization direction of the other ferromagnetic layers is rotated, the respective magnetization directions of the first and the second ferromagnetic layers on the opposite sides of the nonmagnetic layers, respectively, are set in an antiparallel alignment, so that the resistivity of the multilayer thin-film structure increases.

When the respective directions of spontaneous magnetization of the first and the second ferromagnetic layers on the opposite sides of the nonmagnetic layers, respectively, are perpendicular to each other and no external magnetic field is applied to the multilayer thin-film structure, the resistivity of the multilayer thin-film structure is between the aforesaid resistivity.

Accordingly, any particular bias magnetic field need not be applied to the multilayer thin-film structure, the resistivity of the multilayer thin-film structure can be varied in a satisfactory linearity in a wide range, and a large MR ratio can be achieved because the resistance can be greatly changed by controlling the magnetic field. Although it is most preferable that the respective directions of spontaneous magnetization of the first and the second ferromagnetic layers are perpendicular to each other, the angle between the directions of spontaneous magnetization need not be precisely 90° and may be in the range of 80– to 110–.

Figure 1:
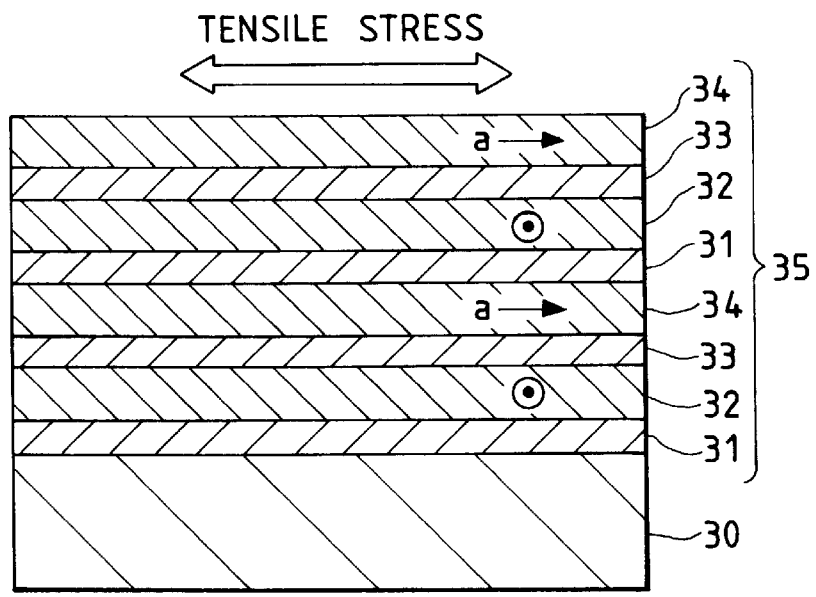
FIG. 1 is a sectional view of a multilayer thin-film structure formed by laminating ferromagnetic layers and nonmagnetic layers and having a tensile stress induced therein.

Referring to FIG. 1, a multilayer thin-film structure 35 in a preferred embodiment according to the present invention is formed by stacking, on a substrate 30 formed of a nonmagnetic material, a plurality of layered structures each formed by sequentially depositing a nonmagnetic layer 31 of a nonmagnetic material, such as Cu, Ag, Au or the like, a first ferromagnetic layer 32 of a ferromagnetic material, a nonmagnetic layer 33 of a nonmagnetic material, such as Cu, Ag, Au or the like and a second ferromagnetic layer 34 of a ferromagnetic material. The multilayer thin-film structure 35 shown in FIG. 1 has two layered structures.

The nonmagnetic material forming the substrate 30 is glass, Si, $Al_2O_3$, TiC, SiC, a sintered material of $Al_2O_3$ and TiC, Zn ferrite or the like. The ferromagnetic material forming the ferromagnetic layers 32 and 34 is an NiFe alloy, an NiFeCo alloy, a CoFe alloy, a CoNi alloy, a CoZr amorphous alloy or the like. The second ferromagnetic layers 34 are formed of a ferromagnetic material having a positive magnetostriction constant and the first ferromagnetic layers 32 are formed of a ferromagnetic material having a negative magnetostriction constant. A uniaxial tensile stress in parallel to the surfaces of the component layers is induced in the multilayer thin-film structure 35.

In the multilayer thin-film structure shown in FIG. 1, the direction of spontaneous magnetization of the second ferromagnetic layers 34 is the same as the direction of the arrows a, and the direction of spontaneous magnetization of the first ferromagnetic layers is perpendicular to the paper in FIG. 1. Therefore, the respective directions of spontaneous magnetization of the first ferromagnetic layers 32 and that of the second ferromagnetic layers 34 are perpendicular to each other, the cause of which will be described below.

Suppose that the second ferromagnetic layers 34 having a positive magnetostriction constant and the first ferromagnetic layers 32 having a negative magnetostriction constant are formed alternately on the opposite sides of the nonmagnetic layers 31, respectively, a uniaxial stress (magnitude; σ) is induced in the multilayer thin-film structure, the second ferromagnetic layers 34 has a saturation magnetostriction constant $\lambda_A$ and the first ferromagnetic layers 32 has a saturation magnetostriction constant $\lambda_B$. Then, Uniaxial magnetic anisotropy having a magnetoelastic energy of $(3/2)\lambda_A \cdot \sigma$ is induced in the second ferromagnetic layers 34 and uniaxial magnetic anisotropy having a magnetoelastic energy of $(3/2)\lambda_B \cdot \sigma$ is induced in the first ferromagnetic layers 32. When a uniaxial tensile stress is induced in the multilayer thin-film structure 35, the axis of easy magnetization of the second ferromagnetic layers 34 is set in parallel to the direction of the uniaxial tensile stress in a plane including the layers and the axes of easy magnetization of the first ferromagnetic layers 32 are set at right angles to the direction of the uniaxial tensile stress in a plane including the layers. Therefore, the respective directions of spontaneous magnetization of the second ferromagnetic layers 32 and the first ferromagnetic layers 34 are perpendicular to each other.

The magnetizations of the second ferromagnetic layers 34 having the axes of easy magnetization parallel to the direction of a magnetic field of a very low intensity to be created by a magnetic recording medium or the like must be difficult to be moved by an external magnetic field. Therefore, the magnetostriction of the second ferromagnetic layers 34 must be smaller than that of the first ferromagnetic layers 32. On the other hand, the magnetizations of the first ferromagnetic layers 32 having the axes of easy magnetization perpendicular to the direction of the applied magnetic field of a very low intensity to be detected must be sensitively rotated by the applied magnetic field of a very low intensity. Since the sensitivity of magnetoresistive effect is reduced when the magnetic anisotropy energy of the first ferromagnetic layers 32 is excessively large, the magnetostriction constant of the first ferromagnetic layers 32 must be smaller than that of the second ferromagnetic layers 34.

Figure 2:
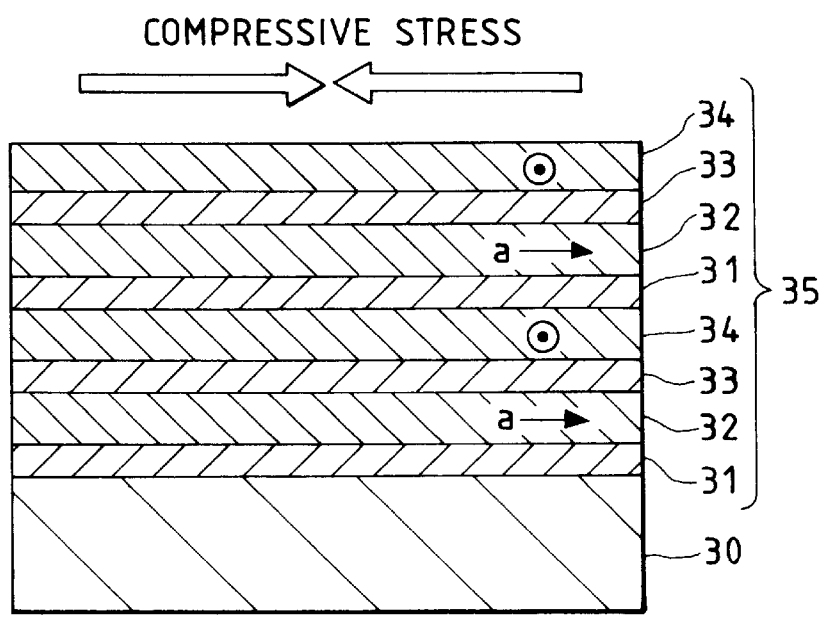
FIG. 2 is a sectional view of a multilayer thin-film structure formed by laminating ferromagnetic layers and nonmagnetic layers and having a compressive stress induced therein.

FIG. 2 shows the directions of spontaneous magnetization in the multilayer thin-film structure 35 when an uniaxial compressive stress is induced in the multilayer thin-film structure 35. In this case, the directions of spontaneous magnetization of the second ferromagnetic layers 34 are perpendicular to the paper in FIG. 2, and those of the first ferromagnetic layers 32 are parallel to the direction of the uniaxial compressive stress. Consequently, the respective directions of spontaneous magnetization of the second ferromagnetic layers 34 and the first ferromagnetic layers 32 are perpendicular to each other. The respective directions of spontaneous magnetization of the second ferromagnetic layers 34 and the first ferromagnetic layers 32 in the state where the uniaxial compressive stress is induced in the multilayer thin-film structure 35 are opposite to those of the second ferromagnetic layers 34 and the first ferromagnetic layers 32 in FIG. 1, respectively. But in this case the respective directions of spontaneous magnetization of the second ferromagnetic layers 34 and the first ferromagnetic layers 32 are also perpendicular to each other.

In a multilayer thin-film structure according to a second aspect of the present invention comprising first and second ferromagnetic layers having directions of spontaneous magnetization perpendicular each other, the magnetizations of the ferromagnetic layers having the direction of spontaneous magnetization parallel to the direction of a magnetic field need to be difficult to move. If both the magnetization directions of the first and the second ferromagnetic layers are rotated similarly, the change of the angle between the magnetization directions of the first and the second ferromagnetic layers that contributes to the change of the resistance is small and if domain wall displacement occurs easily in the ferromagnetic layers to be pinned and the magnetization reverses, an increase in resistance in some regions and a decrease in resistance in other regions cancel out each other and hence the change in resistance of the multilayer thin-film structure is small. Therefore, the magnetic anisotropy energy of the first or the second ferromagnetic layers must be large to make the spontaneous magnetization of the same ferromagnetic layers difficult to be moved, and it is preferable to cause a satisfactorily large change in the resistance of the multilayer thin-film structure that the absolute value of the uniaxial magnetic anisotropy energy is 500 J/m³ or above.

The magnetization direction of the spontaneous magnetization of the ferromagnetic layers perpendicular to the direction of the applied magnetic field must be highly sensitive to the applied magnetic field and hence the absolute value of the uniaxial magnetic anisotropy energy must be small. However, the absolute value of the uniaxial magnetic anisotropy energy is excessively small, the direction of spontaneous magnetization cannot be stably oriented substantially perpendicularly to the direction of the applied magnetic field in a state where no magnetic field is applied. Therefore, the absolute value of the uniaxial magnetic anisotropy energy must be 50 J/m³ at the minimum. Since the uniaxial magnetic anisotropy energy of the ferromagnetic layers must be smaller than that of the ferromagnetic layers to be pinned, the absolute value of the uniaxial magnetic anisotropy energy must be 500 J/m³ or below.

In accordance with a third aspect of the present invention, when obtaining the uniaxial magnetic anisotropy energy of the first or the second ferromagnetic layers by the magnetoelastic effect of a uniaxial external force and the external force is that acting on the magnetic head or the sensing device, the absolute value of a saturation magnetostriction constant necessary for obtaining the magnetic anisotropy energy mentioned in connection with the second aspect of the present invention must be less than $2 \times 10^{-6}$ and that of the other ferromagnetic layers must be $2 \times 10^{-6}$ or above.

In accordance with a fourth aspect of the present invention, similarly to the condition in accordance with the second aspect of the present invention, the absolute value of the anisotropy energy of the first or the second ferromagnetic layers must be 500 J/m³ and that of the other ferromagnetic layers must be in the range of 50 to 500 J/m³. The fourth aspect of the present invention differs from the second aspect of the present invention in that the magnetic anisotropy of the ferromagnetic layers having easily movable magnetization is more dependent on induced magnetic anisotropy established during magnetic field film formation or magnetic field heat treatment than magnetoelastic effect. When induced magnetic anisotropy established by magnetic field film formation exceeds anisotropy established by magnetoelastic effect, the respective magnetostrictions of the first and the second ferromagnetic layers need not necessarily of opposite signs.

In accordance with a fifth aspect of the present invention, restrictions are placed on the composition of the materials for forming the first and the second ferromagnetic layers to make the respective signs of the saturation magnetostriction constants of the first and the second ferromagnetic layers opposite to each other. It is preferable that either the first or the second ferromagnetic layers are formed of Ni, an $Ni_{100-x}Fe_xCo$ alloy or an $Ni_{100-x}Fe_xCo_y$ alloy, where $0 \leq x \leq 20$ and $0 \leq y \leq 60$, and the other ferromagnetic layers are formed of an $Ni_{100-x}Fe_x$ alloy or an $Ni_{100-x}Fe_xCo_y$ alloy, where $7 \leq x \leq 60$ and $0 \leq y \leq 60$.

Figure 3:
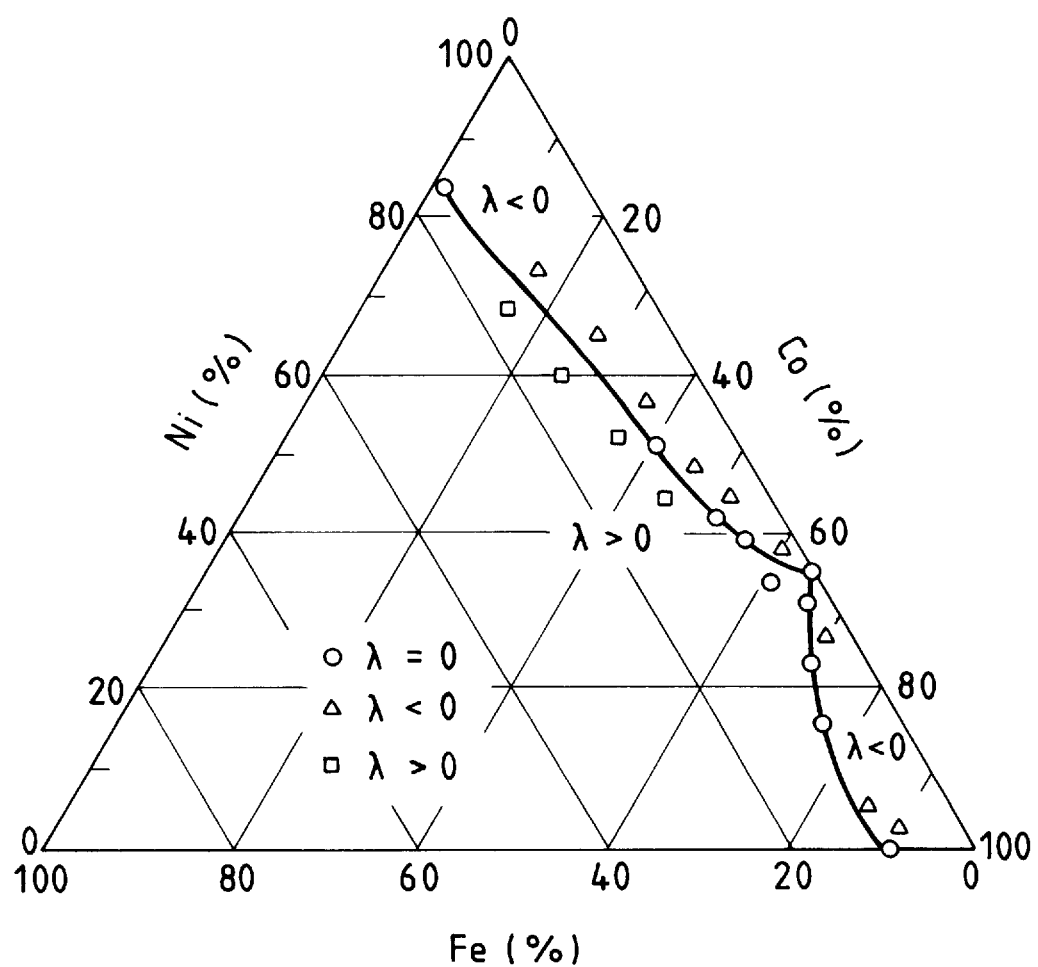
FIG. 3 is a triangular composition diagram showing the compositions of FeNiCo alloys and magnetostriction.

These compositions of the materials are preferred because the signs of the magnetostriction constants of the compositions are known from the composition diagrams of the alloys for forming the ferromagnetic layers. FIG. 3 is a triangular composition diagram showing the relation between the magnetostriction constants and the compositions of those alloys. In FIG. 3, blank circles indicate compositions having magnetostriction constant $\lambda=0$, blank triangles indicates compositions having magnetostriction constant $\lambda<0$, blank squares indicate compositions having magnetostriction constant $\lambda>0$. It is known from FIG. 3 that the aforesaid ranges of composition are appropriate.

The Fe content of the composition is 60 at. % or below because, if the Fe content exceeds 60 at. %, the composition approaches that of invar, the saturation magnetization of the material is very low, crystals of a body-centered cubic lattice structure are liable to be formed in crystals of a face-centered cubic lattice structure, the crystallographic matching between the material of the composition and a nonmagnetic metal, such as Cu, Ag, Au or the like is not satisfactory, and the interface scattering of conduction electrons increases reducing the MR ratio. The Co content of the composition is 60 at. % or below because, the Co content exceeds 60 at. %, the magnetic anisotropy of crystals increases and the magnetization of the ferromagnetic layers to be moved becomes difficult to move.

Figure 4:
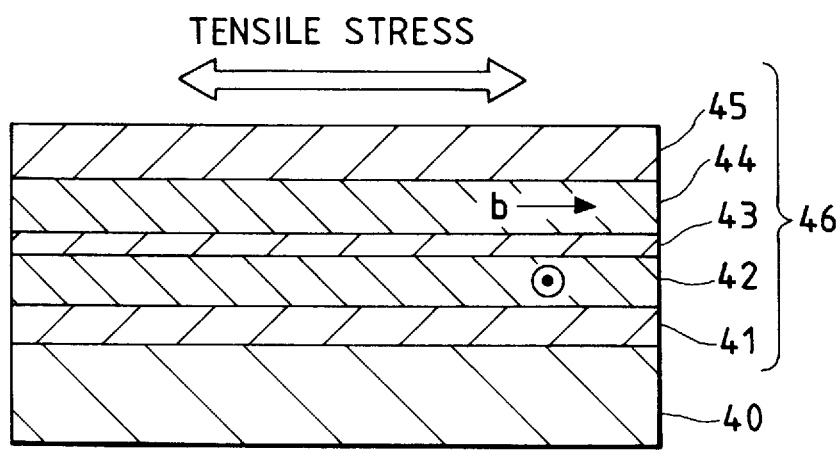
FIG. 4 is a sectional view of a multilayer thin-film structure formed by laminating an antiferromagnetic layer, a ferromagnetic layer, a nonmagnetic layer, a ferromagnetic layer and a nonmagnetic layer, and having a tensile stress induced therein.

FIG. 4 shows a multilayer thin-film structure 46 in accordance with a sixth aspect of the present invention. The multilayer thin-film structure 46 is formed by sequentially depositing, on a nonmagnetic substrate 40, a buffer layer 41, a free ferromagnetic layer 42 of a ferromagnetic material, such as an NiFe alloy, a nonmagnetic layer 43 of a nonmagnetic material, such as Cu, Ag, Au or the like, a reference ferromagnetic layer 44 of a ferromagnetic material, such as an NiFe alloy and an antiferromagnetic layer 45 of an antiferromagnetic material, such as an FeMn alloy in that order. A uniaxial tensile stress parallel to a plane including the layers is induced in the multilayer thin-film structure 46.

The buffer layer 41 formed over the surface of the substrate 40 is intended to enhance the adhesion of film forming substance to the substrate 40, to improve the flatness of the layers and to align the crystal orientation of the film. If the substrate 40 has satisfactory wettability or the film can be formed under film forming conditions capable of satisfactorily aligning the orientation of crystals, the buffer layer 41 may be omitted. Naturally, the multilayer thin-film structures 35 previously described with reference to FIGS. 1 and 2 may be provided with a buffer layer between the multilayer thin-film structure 35 and the substrate 30.

In the multilayer thin-film structure 46 shown in FIG. 4, the direction of spontaneous magnetization of the reference ferromagnetic layer 44 is indicated by the arrow b and the direction of spontaneous magnetization of the free ferromagnetic layer 42 is perpendicular to the paper in FIG. 4. Therefore, the respective directions of spontaneous magnetization of the reference ferromagnetic layer 44 and the free ferromagnetic layer 42 are perpendicular to each other.

Figure 5:
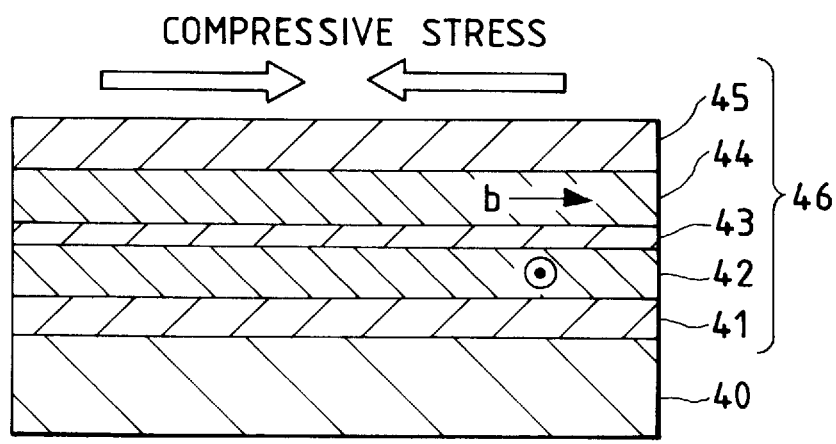
FIG. 5 is a sectional view of a multilayer thin-film structure formed by laminating an antiferromagnetic layer, a ferromagnetic layer, a nonmagnetic layer, a ferromagnetic layer and a nonmagnetic layer, and having a compressive stress induced therein.

FIG. 5 shows a multilayer thin-film structure 46 in a modification of the multilayer thin-film structure 46 shown in FIG. 4. The multilayer thin-film structure 46 of FIG. 5 is formed by sequentially depositing, on a substrate 40, a buffer layer 41, a free ferromagnetic layer 42, a nonmagnetic layer 43, a reference ferromagnetic layer 44 and an antiferromagnetic layer 45 in that order. A uniaxial compressive stress parallel to a plane including the layers is induced in the multilayer thin-film structure 46.

In the multilayer thin-film structure 46 shown in FIG. 5, the direction of spontaneous magnetization of the reference ferromagnetic layer 44 is indicated by the arrow b and the direction of spontaneous magnetization of the free ferromagnetic layer 42 is perpendicular to the paper in FIG. 5. Therefore, the respective directions of spontaneous magnetization of the reference ferromagnetic layer 44 and the free ferromagnetic layer 42 are perpendicular to each other. The respective directions of spontaneous magnetization of the reference ferromagnetic layer 44 and the free ferromagnetic layer 42 are perpendicular to each other because the antiferromagnetic layer 45 overlies the reference ferromagnetic layer 44, and the magnetization direction of the reference ferromagnetic layer 44 is pinned by a bias magnetic field created by the magnetic exchange coupling of the reference ferromagnetic layer 44 and the antiferromagnetic layer 45.

Techniques for fixing the spontaneous magnetization of the reference ferromagnetic layer 44 by the exchange coupling effect of the antiferromagnetic layer 45 are described in detail in U.S. Pat. No. 5,159,513 and JP-A No. 6-111252. When these known techniques are employed, the direction of spontaneous magnetization must be adjusted by turning the magnetic field during the magnetic field film forming process when constructing the multilayer thin-film structure on the substrate; that is, the magnetic field applied to the substrate must be turned through an angle of 90° during the magnetic field film forming process to make the respective directions of spontaneous magnetization of those ferromagnetic layers perpendicular to each other, which requires the film forming apparatus to be provided with a complex magnetic field turning mechanism.

Figure 6:
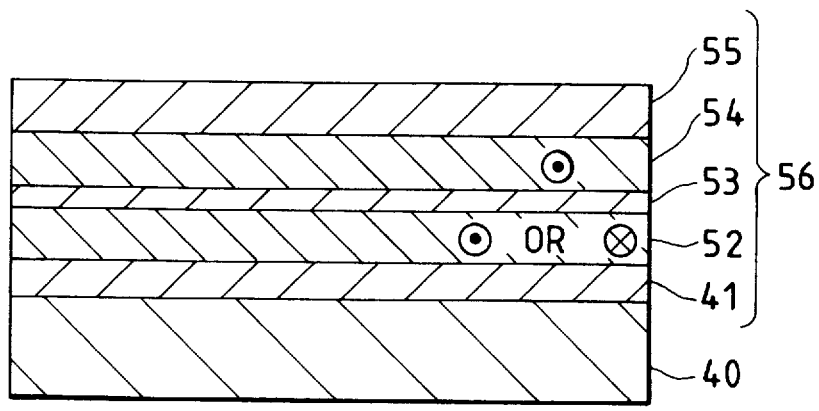
FIG. 6 is a sectional view of a multilayer thin-film structure similar to that shown in FIG. 5, in which the magnetization directions of the ferromagnetic layers are in parallel to each other.

The multilayer thin-film structure 46 of FIG. 4 or 5 is fabricated presupposing that the direction of an external magnetic field is not changed during the formation or heat treatment of the component layers. In the magnetic field processing, a magnetic field is applied so that the respective magnetization directions of all the ferromagnetic layers are parallel to the direction of a magnetic field to be detected. FIG. 6 shows a multilayer thin-film structure 56 having a free ferromagnetic layer 52, a nonmagnetic layer 53, a reference ferromagnetic layer 54 and an antiferromagnetic layer 55 formed under such a condition. In this multilayer thin-film structure 56, the directions of spontaneous magnetization of the ferromagnetic layers are aligned with a plane including the layers and are not perpendicular to each other. Therefore, only the magnetization direction of the free ferromagnetic layer 52 must be oriented by magnetoelastic effect in a direction perpendicular to the direction of a magnetic field to be detected.

Figure 7:
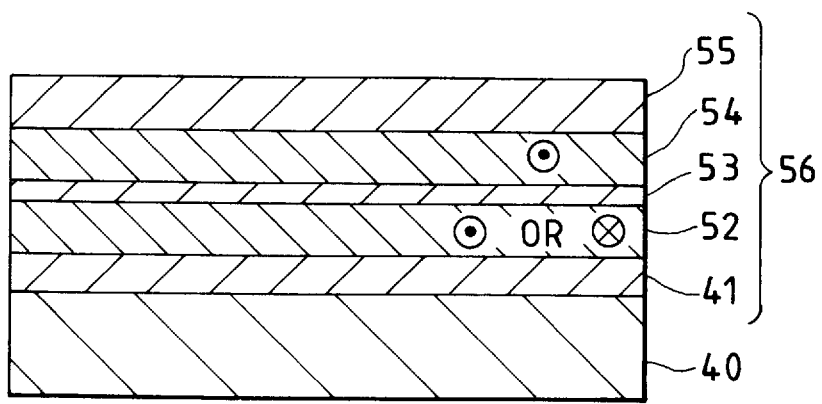
FIG. 7 is a sectional view of a multilayer thin-film structure similar to that shown in FIG. 5, in which the magnetization directions of the ferromagnetic layers are in parallel to each other.
Figure 8:
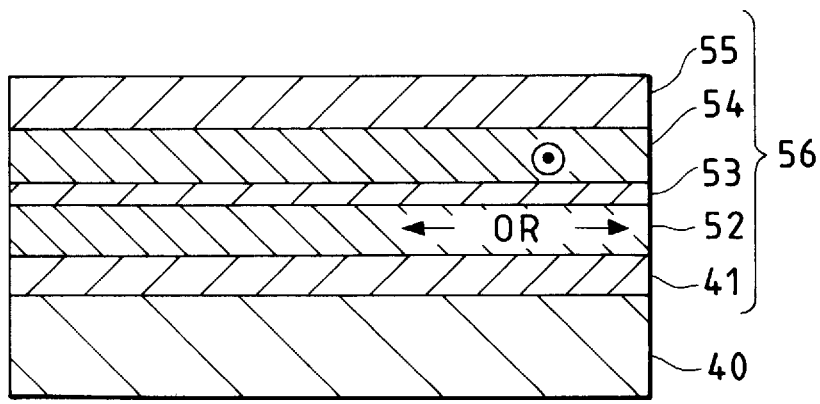
FIG. 8 is a sectional view of a multilayer thin-film structure similar to that shown in FIG. 5, in which the magnetization directions of the ferromagnetic layers are perpendicular to each other.
Figure 9:
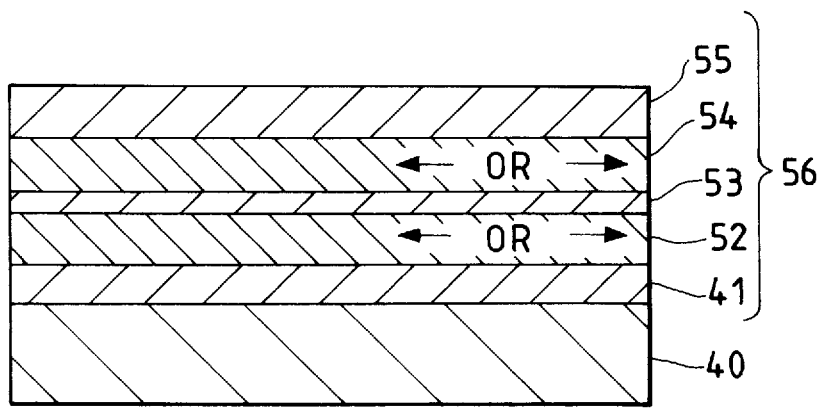
FIG. 9 is a sectional view of a multilayer thin-film structure similar to that shown in FIG. 5, in which the magnetization directions of the ferromagnetic layers are in parallel to each other.

The orientation of the magnetization direction of the free ferromagnetic layer 52 requires magnetoelastic energy of $(3/2)\lambda_2 \cdot \sigma$, where $\lambda_2$ is magnetostriction and $\sigma$ is uniaxial stress induced in the multilayer thin-film structure, greater than anisotropy energy $K_U$ applied in the magnetic field processing. If $(3/2)\lambda_2 \cdot \sigma < K_U$, the respective magnetization directions of the reference ferromagnetic layer 54 and the free ferromagnetic layer 52 are parallel to each other as shown in FIG. 7, so it is undesirable in which a blank circle with a dot at its center indicates a magnetization direction perpendicular to and out of the paper, and a blank circle with a cross therein indicates a magnetization direction perpendicular to and into the paper. If $K_U < (3/2)\lambda_2 \cdot \sigma < H_{UA} \cdot M_S/2$, where $H_{UA} \cdot M_S/2$ is the anisotropy energy of the reference ferromagnetic layer 54, the respective magnetization directions of the reference ferromagnetic layer 54 and the free ferromagnetic layer 52 are perpendicular to each other as shown in FIG. 8. If the magnetoelastic energy of the uniaxial stress is excessively large and greater than the anisotropy energy $H_{UA} \cdot M_S/2$ of the reference ferromagnetic layer 54, the respective magnetization directions of both the ferromagnetic layers are rotated through an angle of 90° and become transversely parallel to each other as shown in FIG. 9, which is undesirable.

The uniaxial stress may be induced by an external force applied to the multilayer thin-film structure when fabricating a device employing the multilayer thin-film structure, such as a magnetic head position sensor or a rotation sensor, or a stress remaining in a covering film covering the multilayer thin-film structure.

The magnetic characteristics of a simplified model of the multilayer thin-film structure 35 shown in FIG. 1 will be described with reference to magnetization curves. In a model having a construction like that of the multilayer thin-film structure 35 and having one first ferromagnetic layer 32 and one second ferromagnetic layer 34, the second ferromagnetic layer 34 having a fixed magnetization direction and the first ferromagnetic layer 32 having a rotatable magnetization direction exhibit magnetic characteristics as indicated by magnetization curve $K_1$ and $K_2$, respectively, shown in FIG. 10. The plot of FIG. 10 includes values of H sat and –H sat, the latter being a measure of the saturation value of H when the magnetic field is applied in direction of –H. When the intensity H of an external magnetic field is between the coercive force $H_{c1}$ of the first ferromagnetic layer 32 and the coercive force $H_{c2}$ of the second ferromagnetic layer 34, i.e., $H_{c1}<H<H_{c2}$, or when the intensity –H of the external magnetic field is between the coercive force $-H_{c1}$ of the first ferromagnetic layer 32 and the coercive force $-H_{c2}$ of the second ferromagnetic layer 34, i.e., $-H_{c1}>H>H_{c2}$, the respective magnetization directions of the first ferromagnetic layer 32 and the second ferromagnetic layer 34 formed on the opposite sides of a nonmagnetic layer 33 are reverse to each other and the resistance of the multilayer thin-film structure increases.

Figure 10:
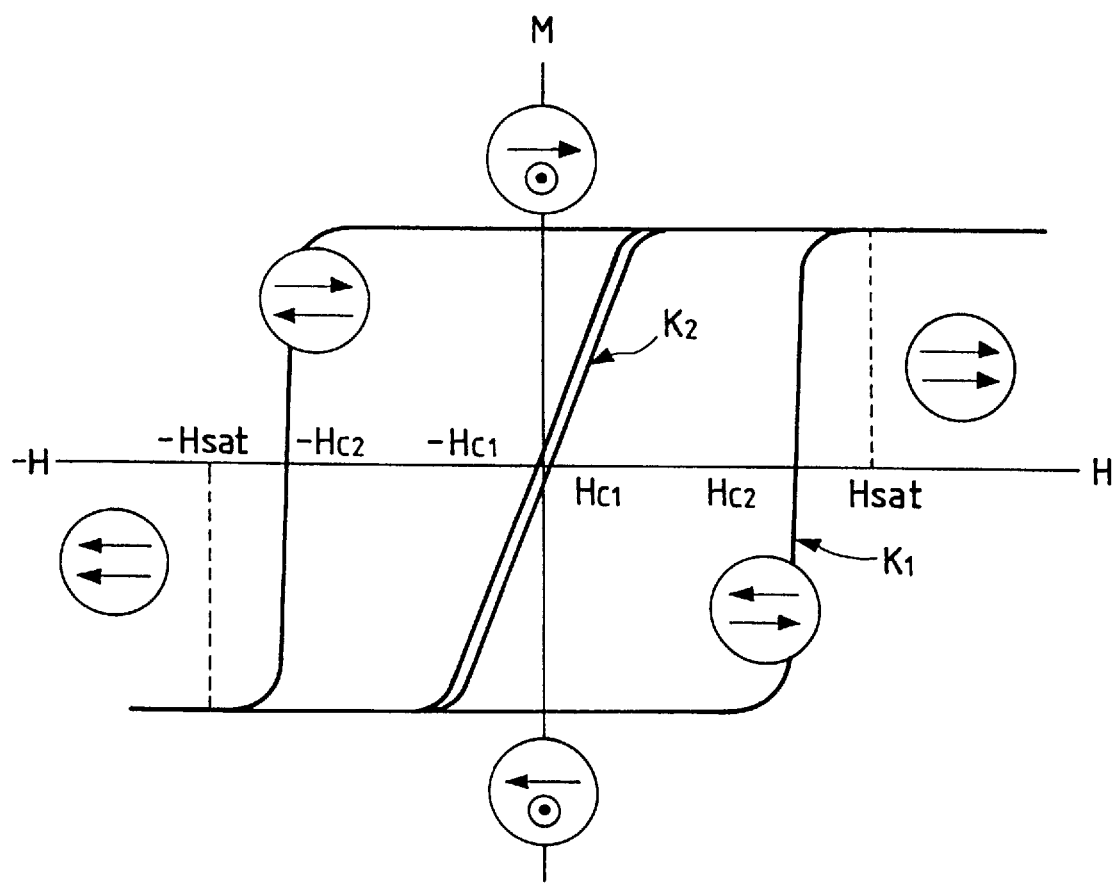
FIG. 10 is a graph showing a magnetization hysteresis loop representing the magnetic characteristics of a multilayer thin-film structure in accordance with the present invention.
Figure 11:
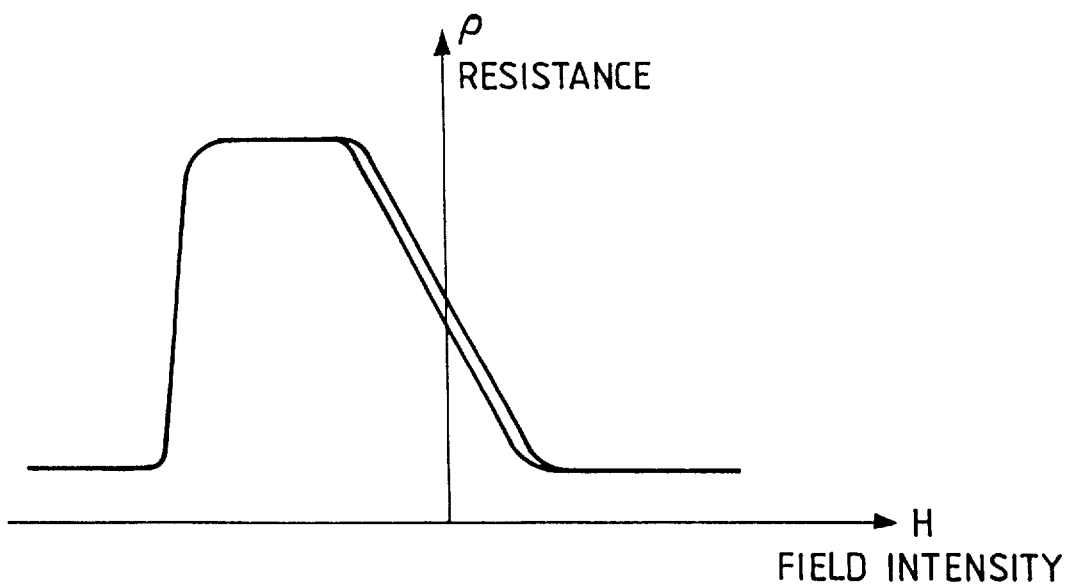
FIG. 11 is a graph showing the variation of the resistance of a multilayer thin-film structure having magnetic characteristics shown in FIG. 10 with the variation of an applied magnetic field.

When the fixed magnetization direction of the second ferromagnetic layer 34 is directed to the right, as viewed in FIG. 10 and the magnetization direction of the first ferromagnetic layer 32 is directed in a direction perpendicular to the paper in FIG. 10, the resistance of the multilayer thin-film structure varies in a satisfactory linearity as shown in FIG. 11. The multilayer thin-film structure having variable resistance varying in such a satisfactory linearity can be effectively used as an MR effect device for magnetic heads, position sensors, rotation sensors and the like.

Examples of multilayer thin-film structures in accordance with the present invention will be described hereinafter with reference to the accompanying drawings.

A 5 nm thick underlying layer of Ta (buffer layer) was formed over the surface of a single-crystal silicon substrate by a high-frequency magnetron sputtering apparatus, and then a plurality of layered structures each comprising a 3 nm thick first ferromagnetic layer A of an NiFe alloy or an NiFeCo alloy shown in Table 1, a 2.5 nm thick first nonmagnetic layer of a metal shown in Table 1, a 3 nm thick second ferromagnetic layer B of an NiFe alloy or an NiFeCo alloy shown in Table 1 and a 2.5 nm thick second nonmagnetic layer of a metal shown in Table 1 were stacked on the underlying layer. The number of the layered structures 60 was ten (Table 1).

A 15 nm thick first ferromagnetic layer corresponding to the aforesaid first ferromagnetic layer and a 15 nm thick second ferromagnetic layer corresponding to the aforesaid second ferromagnetic layer were formed individually on separate substrates, respectively, and the uniaxial magnetic anisotropy energy and the saturation magnetostriction constant of each of the first and the second ferromagnetic layer were determined from the variation of the magnetization curve for the ferromagnetic layer with the variation of stress.

Figure 12A:
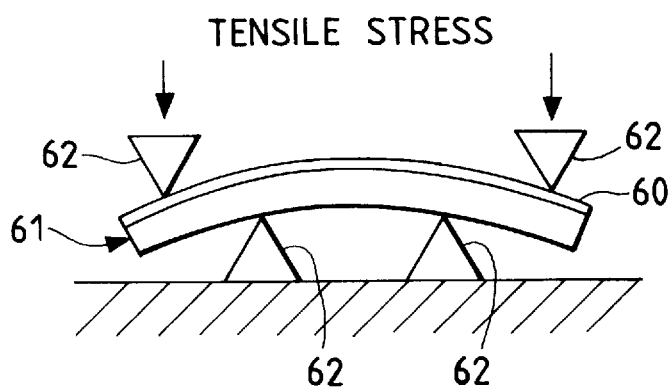
FIG. 12(A) is a diagrammatic view of assistance in explaining a method of inducing a tensile stress in a multilayer thin-film structure, embodying the present invention.
Figure 12B:
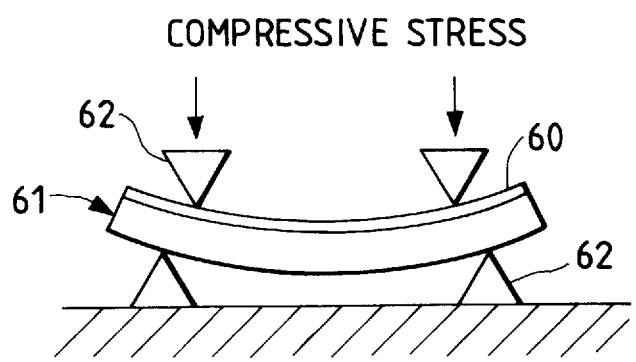
FIG. 12(B) is a diagrammatic view of assistance in explaining a method of inducing a compressive stress in a multilayer thin-film structure, embodying the present invention.

A test multilayer structure was formed by forming a layered structure 60 similar to the aforesaid layered structures on a single-crystal silicon substrate 61. A uniaxial tensile stress or a uniaxial compressive stress was induced in the test multilayer structure in a direction in which a magnetic field is applied for MR measurement (a direction perpendicular to the direction of current flow) by four-point bending using four jigs 62 having the shape of a triangular prism (FIGS. 12(A) and 12(B)) to obtain data on the layered structure 60. The MR ratio was measured by a four-terminal method, in which the direction of the current and the direction of the magnetic field were perpendicular to each other in a plane including the layer. The MR ratio is defined by:

$$\text{MR ratio} = (\Delta R/R_S) \times 100 \ (\%)$$

Shown in Table 1 are the compositions, the saturation magnetostriction constants $\lambda_A$ and the uniaxial magnetic anisotropy energy of the first ferromagnetic layers, the compositions, the saturation magnetostriction constants $\lambda_B$ and the uniaxial magnetic anisotropy energy of the second ferromagnetic layers, the materials of the nonmagnetic layers, the number of the layered structures, types of uniaxial stresses, and MR ratios. Shown under Table 1 for comparison are the RM ratio of a conventional multilayer thin-film structure formed by sequentially depositing a 5 nm thick buffer layer of Ta, a 6 nm thick ferromagnetic layer of an NiFe alloy, a 2.5 nm nonmagnetic layer of Cu, a 3 nm thick ferromagnetic layer of an NiFe alloy and a 7 nm thick antiferromagnetic layer of an FeMn alloy in that order on a silicon substrate.

TABLE 1

| | Ferromagnetic layer A | | | Ferromagnetic layer B | | | | | |
|---|---|---|---|---|---|---|---|---|---|
| Composition | Saturation magnetostriction constant $\lambda_A$ | Uniaxial anisotropy energy | Composition | Saturation magnetostriction constant $\lambda_B$ | Uniaxial anisotropy energy | Non-magnetic layer | Number n of layered structures | Type of stress | MR ratio |
| ① $Ni_{77}Fe_{23}$ | $+6.8 \times 10^{-6}$ | 1060 J/m³ | $Ni_{83}Fe_{17}$ | $-1.3 \times 10^{-6}$ | 200 J/m³ | Cu | 10 | Tensile | 12% |
| ② $Ni_{88}Fe_{12}$ | $-7.1 \times 10^{-6}$ | 1130 J/m³ | $Ni_{81}Fe_{19}$ | $+1.0 \times 10^{-6}$ | 180 J/m³ | Cu | 10 | Compressive | 11% |
| ③ $Ni_{77}Fe_{23}$ | $+6.8 \times 10^{-6}$ | 1060 J/m³ | $Ni_{83}Fe_{17}$ | $-1.3 \times 10^{-6}$ | 200 J/m³ | Au | 10 | Tensile | 10% |
| ④ $Ni_{77}Fe_{23}$ | $+6.8 \times 10^{-6}$ | 1060 J/m³ | $Ni_{83}Fe_{17}$ | $-1.3 \times 10^{-6}$ | 200 J/m³ | Ag | 10 | Tensile | 7% |
| ⑤ $Ni_{62}Fe_{20}Co_{18}$ | $+8.3 \times 10^{-6}$ | 1300 J/m³ | $Ni_{66}Fe_{16}Co_{18}$ | $-0.8 \times 10^{-6}$ | 150 J/m³ | Cu | 10 | Tensile | 14% |

Prior art
Si substrate/Ta layer (5 nm)/$Ni_{82}Fe_{18}$ layer (6 nm)/Cu layer (2.5 nm)/$Ni_{82}Fe_{18}$ layer (3 nm)/$Fe_{50}Mn_{50}$ layer (7 nm)
MR ratio: 3.8%

As is obvious from Table 1, where as the MR ratio of the conventional multilayer thin-film structure is 3.8%, the MR ratios of the test multilayer thin-film structures Nos. 1 to 7 in accordance with the present invention are in the range of 7 to 14%. It is inferred that the MR ratio of the conventional multilayer thin-film structure is comparatively small because the same multilayer thin-film structure comprises only one layered structure of two ferromagnetic layers of an NiFe alloy.

Figure 14:
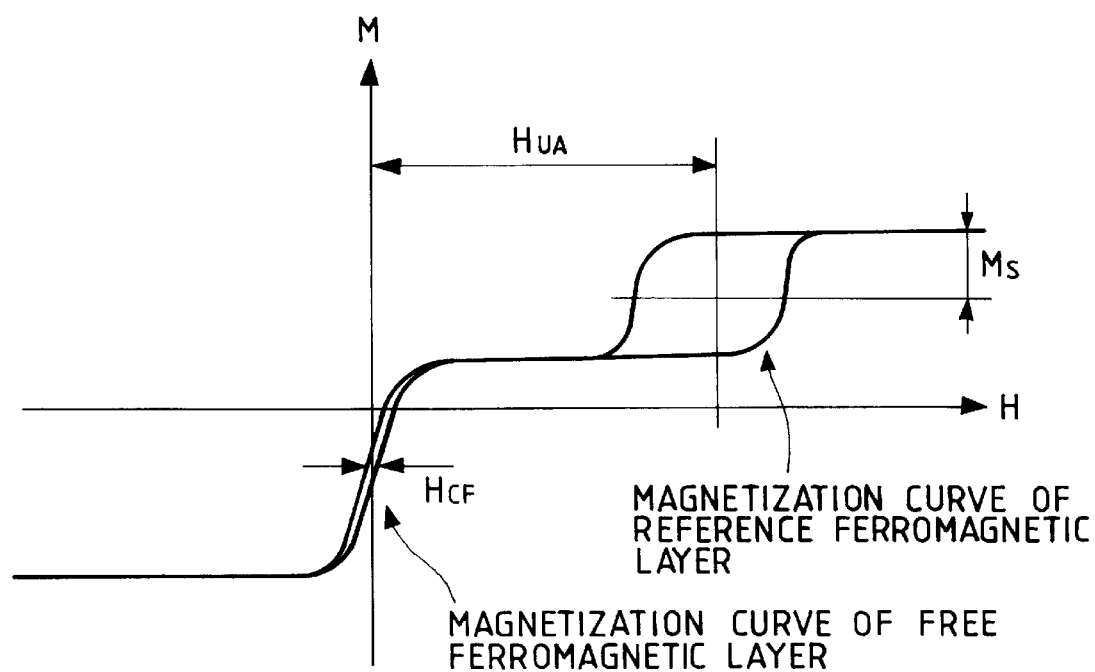
FIG. 14 is a graph showing a magnetization hysteresis curve representing the magnetic characteristics of a multilayer thin-film structure embodying the present invention.

A multilayer thin-film structure was fabricated by the same method as the aforesaid method, in which a magnetic field was applied in a direction in a plane including the film, i.e., a direction of a current that flows during MR measurement, to establish uniaxial anisotropy in the multilayer thin-film structure. In this multilayer thin-film structure, the magnetostriction of the first ferromagnetic layer is large and hence the axis of easy magnetization is rotated through an angle of 90° when a tensile stress is induced therein in a direction perpendicular to the direction of the current, whereas the axis of easy magnetization of the second ferromagnetic layer is not rotated because the magnetostriction of the second ferromagnetic layer is small and conduction magnetic anisotropy established during magnetic field film formation remains therein and, consequently, the respective magnetization directions of the first and the second ferromagnetic layers are perpendicular to each other. The characteristics of this multilayer thin-film structure are tabulated in Table 2A.

the multilayer thin-film structure to obtain a magnetization curve shown in FIG. 14. The coercive force $H_{CF}$ of the free ferromagnetic layer was determined from the magnetization curve and the effect of the bias magnetic field $H_{UA}$ of the antiferromagnetic layer on the reference ferromagnetic layer was evaluated. Measured results are tabulated in Table 2A.

Although the MR ratio of the test multilayer thin-film structure in accordance with the present invention is approximately equal to that of the test multilayer thin-film structure of the conventional type, the index H* of the multilayer thin-film structure of the present invention is greater than that of the conventional multilayer thin-film structure, and the $H_{CF}$ of the former is smaller than that of the latter, which proved the superiority of the multilayer thin-film structure of the present invention to the conventional multilayer thin-film structure.

Figure 15:
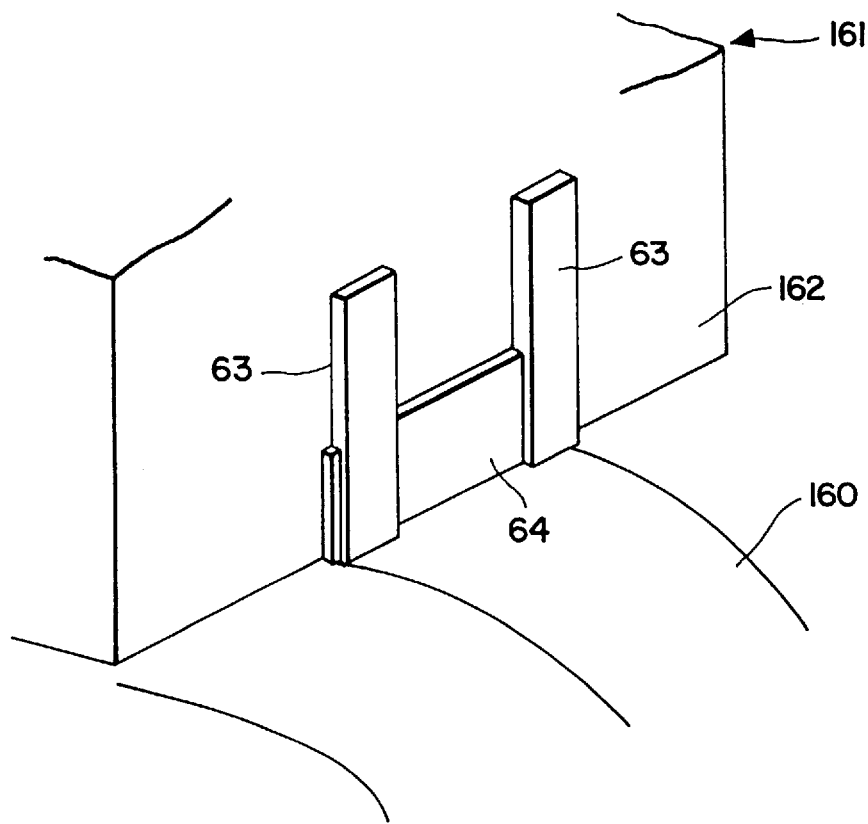
FIG. 15 is a perspective view of a magnetic head provided with a multilayer thin-film structure in accordance with the present invention, and a magnetic recording medium on which magnetic information read by the magnetic head is recorded.
Figure 16:
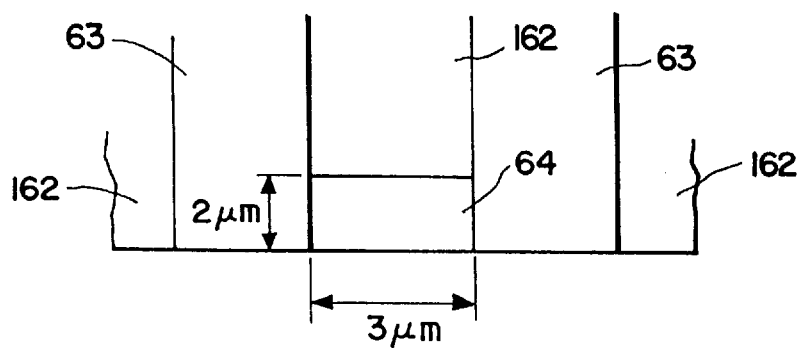
FIG. 16 is an enlarged view of a portion of the magnetic head shown in FIG. 15.
Figure 17:
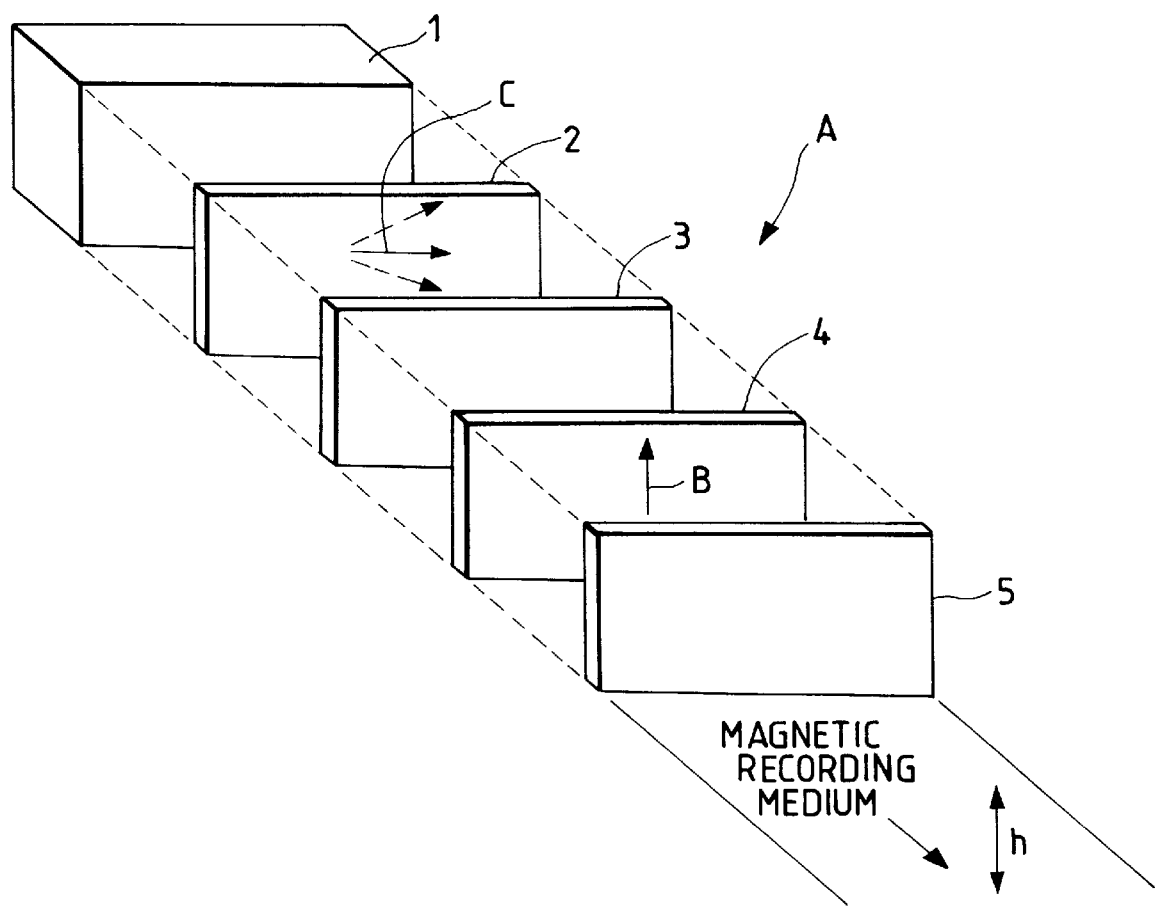
FIG. 17 is an exploded perspective view of a first prior art MR sensor in an example.
Figure 18:
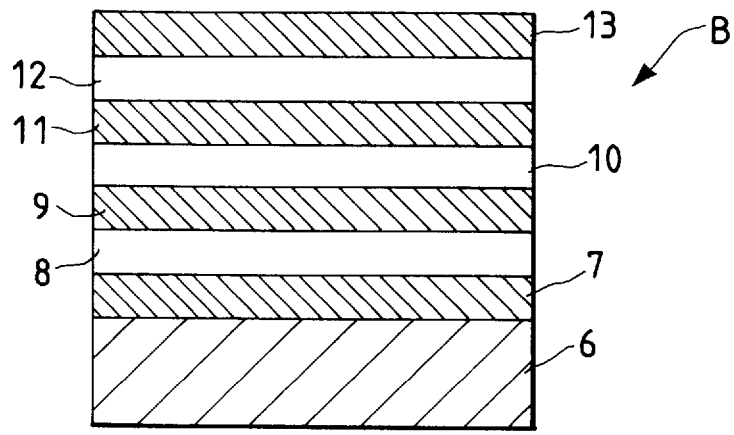
FIG. 18 is a sectional view of a second prior art MR sensor in an example.
Figure 19:
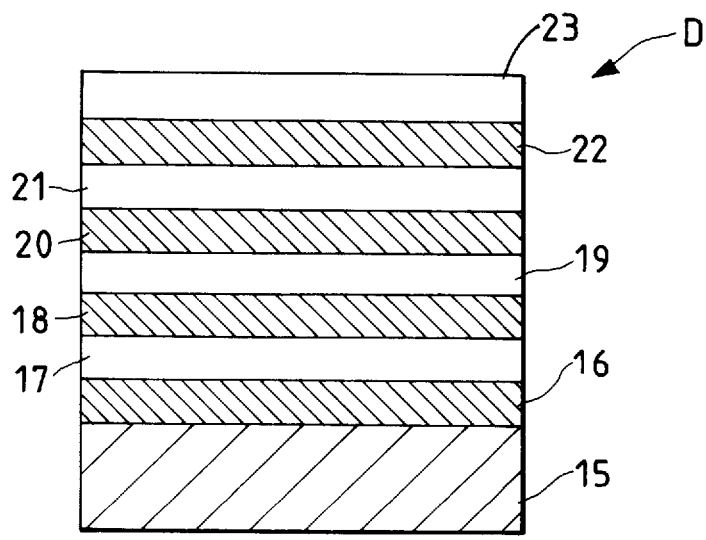
FIG. 19 is a sectional view of a third prior art MR sensor in an example.

FIGS. 15 and 16 illustrates a floating magnetic head 161 incorporating a multilayer thin-film structure of the present invention for reading recorded magnetism from a disk-

TABLE 2A

| | Ferromagnetic layer A | | | Ferromagnetic layer B | | | | | | |
|---|---|---|---|---|---|---|---|---|---|---|
| | Composition | Saturation magnetostriction constant $\lambda_A$ | Uniaxial anisotropy energy | Composition | Saturation magnetostriction constant $\lambda_B$ | Uniaxial anisotropy energy | Non-magnetic layer | Number n of layered structures | Type of stress | MR ratio |
| ⑥ | $Ni_{76}Fe_{24}$ | $+8.0 \times 10^{-6}$ | 1150 J/m$^3$ | $Ni_{82}Fe_{18}$ | $+0.5 \times 10^{-6}$ | 250 J/m$^3$ | Cu | 10 | Tensile | 10% |

TABLE 2B

| | Composition of Ferromagnetic Layer | Magnetostriction Constant $\lambda_2$ | Stress | | $3/2 \lambda^2 \sigma$ | HUA · MS | Ku | H* | HCF | MR ratio |
|---|---|---|---|---|---|---|---|---|---|---|
| | | | Type | Magnitude | | 2 | | | | |
| Example | $Ni_{84}Fe_{16}$ | $-3.3 \times 10^{-6}$ | Tensile | 100 MPa | 495 J/m$^3$ | 6500 J/m$^3$ | 200 J/m$^3$ | 8 Oe | 0.5 Oe | 3.9% |
| Comparative Examples 1 | $Ni_{82}Fe_{18}$ | $+0.5 \times 10^{-6}$ | — | 0 | 0 | 6500 J/m$^3$ | 200 J/m$^3$ | 3 Oe | 2.5 Oe | 3.8% |
| Comparative Examples 2 | The characteristics is equal to that of Comparative example 1 when a magnetic field of a direction is perpendicular to that of a magnetic field for forming the first ferromagnetic layer when forming the second ferromagnetic layer. However, Comparative example needs a complex film forming apparatus. | | | | | | | | | |

Table 2A shows measured data representing the characteristics of the multilayer thin-film structure when the respective signs of the magnetostrictions of the first and the second ferromagnetic layers are the same. As shown in Table 2A, the MR ratio of the multilayer thin-film structure is as low as 10%.

Figure 13:
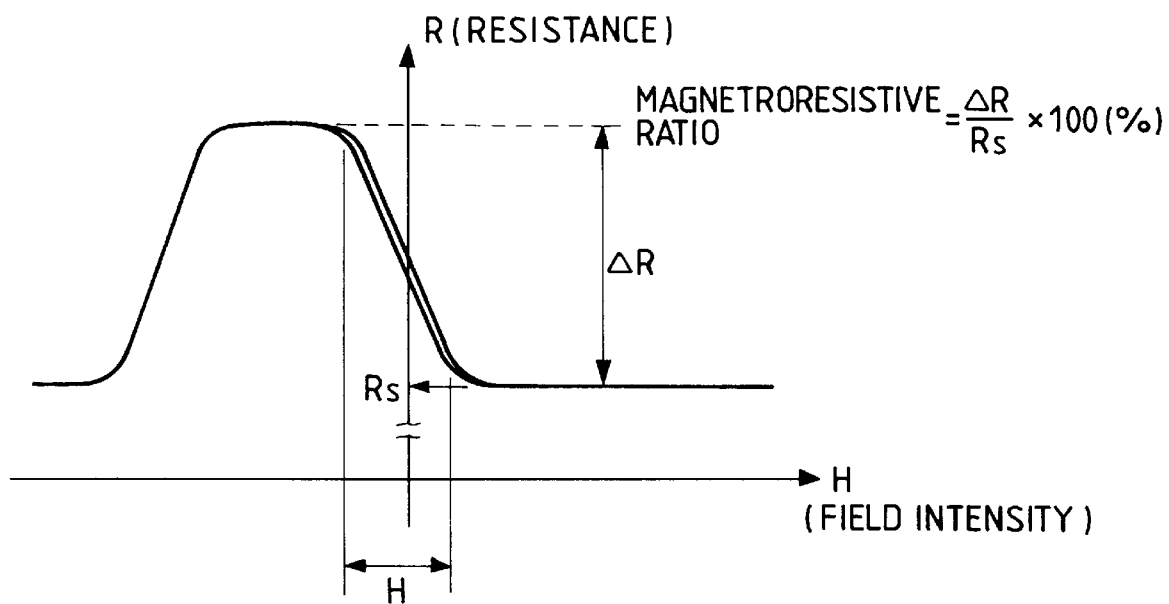
FIG. 13 is a graph showing the variation of the resistance of a multilayer thin-film structure embodying the present invention with the variation of an applied magnetic field.

A multilayer thin-film structure having the same construction as that of the multilayer thin-film structure specified by data shown under the Table 1 and comprising layers of materials of compositions different from those of the materials of the layers of the latter multilayer thin-film structure was fabricated, in which a magnetic field was applied during the film forming process in a direction in a plane parallel to the surface of the substrate (a direction of flow of current for MR measurement). Uniaxial stresses were induced in the multilayer thin-film structure in a direction perpendicular to the direction of flow of current for MR measurement by the same method as previously described with reference to FIGS. 12(A) and 12(B) to measure the MR ratio. The value of H*, i.e., an index indicating the width of an intensity range in which the resistance varies linearly with the variation of the intensity H of the applied magnetic field, shown in FIG. 13 was evaluated. A magnetic field of a direction parallel to the direction of the induced stress was applied to shaped magnetic recording medium 160. The multilayer thin-film structure 64 having the characteristics shown in Table 2B is disposed between a pair of Cu electrode films 63 attached to the back surface of a slider 162 that moves relative to the magnetic recording medium 160. The slider 62 is formed of $Al_2O_3$—TiC (Altic), the interval between the electrode films 63 is 3 μm and the height of the multilayer thin-film structure 64 is 2 μm. The multilayer thin-film structure 64 is formed on a lower shielding film, not shown, formed on an insulating film formed on the slider 162. The surface of the slider 162 is coated with an upper shielding ferromagnetic film covering the electrode films 63 and the multilayer thin-film structure 64, a 2 μm thick protective film of $Al_2O_3$, not shown. A uniaxial stress is induced in the multilayer thin-film structure 64 by the protective film of $Al_2O_3$ or by a processing force that acts on the multilayer thin-film structure 64 when processing the slider 162. The lower surfaces of the slider 162, the electrode films 63 and the multilayer thin-film structure 64 are mirror-finished by lapping.

A current was supplied through the electrode films 63 to the magnetic head 161 and MR ratio was determined from an R-H curve obtained through the measurement of the variation of the resistance with the variation of the intensity of an applied magnetic field. The MR ratio was 3.0% and H* was 12 Oe. The measured results proved that a uniaxial stress was induced in the multilayer thin-film structure 64 by the protective film of $Al_2O_3$ and the processing force, and that respective magnetization directions of the ferromagnetic layers was perpendicular to each other.

As is apparent from the foregoing description, according to the present invention, since the respective magnetization directions of the first ferromagnetic layer(s) and the second ferromagnetic layer(s) differing from each other in magnetostriction constant are controlled by the uniaxial stress induced in the multilayer thin-film structure, the multilayer thin-film structure in which the respective magnetization directions of the first and the second ferromagnetic layer(s) are perpendicular to each other can be easily fabricated.

According to the present invention, the multilayer thin-film structure comprising a plurality of layered structures each comprising the first and the second ferromagnetic layer separated from each other by the nonmagnetic layer can be fabricated. Therefore, the multilayer thin-film structure of the present invention that uses the spin-dependent scattering of conduction electrons that occurs between the first and the second ferromagnetic layer spaced by the nonmagnetic layer has an increased number of interfaces in which spin-dependent electron scattering occurs, so that the MR ratio of the multilayer thin-film structure of the present invention is greater than that of the conventional multilayer thin-film structure.

Furthermore, according to the present invention, since the first and the second ferromagnetic layers are formed of ferromagnetic materials of the same system of composition, the scattering of conduction electrons, which is an impediment to increasing MR ratio, other than spin-dependent scattering is reduced and the MR ratio can be increased.

Although it is impossible to orient the magnetization directions of all the ferromagnetic layers having a high coercive force of the conventional multilayer thin-film structure formed by stacking the plurality of ferromagnetic layers of different materials differing in coercive force with a nonmagnetic layer interposed between the adjacent ferromagnetic layers perfectly in parallel to each other, the magnetization directions of the first or the second ferromagnetic layers of the multilayer thin-film structure can be surely fixed in parallel to each other and hence the multilayer thin-films structure of the present invention has a large MR ratio.

When the first and the second ferromagnetic layers are formed so that the uniaxial magnetic anisotropy energy of either the first or the second ferromagnetic layers is greater than that of the other, the magnetization directions of the ferromagnetic layers having the greater uniaxial magnetic anisotropy energy can be easily pinned and the magnetization directions of the ferromagnetic layers having the smaller uniaxial magnetic anisotropy energy can be rotated by a low-intensity magnetic field. Therefore, multilayer thin-film structure is capable of sensitively responding to a low-intensity magnetic field to change its resistance.

Since the multilayer thin-film structure of the present invention need not be provided with the FeMn alloy layer necessary for fixing the magnetization directions of the ferromagnetic layers of the conventional multilayer thin-film structure, the multilayer thin-film structure of the present invention is free from problems in corrosion resistance and environment resistance.

Although the direction of the magnetic field applied to the films must be changed during film forming processes when fabricating the conventional multilayer thin-film structure to direct the respective directions of spontaneous magnetization of the ferromagnetic layers, the present invention does not need any special device for changing the direction of the magnetic field for different film forming processes. Therefore the multilayer thin-film structure of the present invention can be fabricated by an apparatus less expensive than that necessary for fabricating the conventional multilayer thin-film structure.

The processing force that acts on the multilayer thin-film structure when processing a device incorporating the multilayer thin-film structure or the force of the covering layer covering the multilayer thin-film structure can be effectively used for inducing the uniaxial stress in the multilayer thin-film structure, the uniaxial stress can be easily induced in the multilayer thin-film structure.

The antiferromagnetic layer surely pins the magnetization direction of the reference ferromagnetic layer for fixation and the uniaxial stress induced in the multilayer thin-film structure ensures directing the magnetization direction of the free ferromagnetic layer in a direction perpendicular to the magnetization direction of the reference ferromagnetic layer. The magnetization direction of the free ferromagnetic layer can be surely rotated by a low-intensity magnetic field created by a magnetic recording medium by properly setting the unidirectional magnetic anisotropy energy dominating the magnetization direction of the free ferromagnetic layer relative to the anisotropy energy dominating the magnetization direction of the reference ferromagnetic layer.

Although the invention has been described in its preferred form with a certain degree of particularity, obviously many changes and variations are possible therein. It is therefore to be understood that the present invention may be practiced otherwise than as specifically described herein without departing from the spirit and scope thereof.

What is claimed is:

1. A multilayer thin-film structure for use to construct a magnetoresistive effect device, having at least one layered structure formed by depositing a nonmagnetic layer, a first ferromagnetic layer formed of a ferromagnetic metal or a ferromagnetic alloy having a positive saturation magnetostriction constant, a nonmagnetic layer, and a second ferromagnetic layer formed of a ferromagnetic metal or a ferromagnetic alloy having a negative saturation magnetostriction constant in that order; a uniaxial stress being induced therein;

spontaneous magnetization of said ferromagnetic layers on opposite sides of said nonmagnetic layer, respectively, being perpendicular to each other.

2. A multilayer thin-film structure for use to construct a magnetoresistive device according to claim 1, wherein the first and the second ferromagnetic layer spaced by the nonmagnetic layer have uniaxial magnetic anisotropy, the respective axes of easy magnetization are perpendicular to each other in a plane including the layers, the absolute value of the uniaxial magnetic anisotropy energy of either the first or the second ferromagnetic layer is 500 $J/m^3$ or above, and that of the other ferromagnetic layer is in the range of 50 to 500 $J/m^3$.

3. A multilayer thin-film structure for use to construct a magnetoresistive device according to claim 2, wherein the ferromagnetic layers are formed of $Ni_{100-x}Fe_x$ alloy or $Ni_{100-x-y}Fe_xCo_y$ alloy, the composition in atomic percent of the alloy forming either the first or the second ferromagnetic layer has a negative saturation constant and meets inequalities:

$0 \leq x \leq 20$ and $0 \leq y \leq 60$ and the composition in atomic percent of the alloy forming the other ferromagnetic layer has a positive saturation magnetostriction constant and meets inequalities:

7≦x≦60 and 0≦y≦60.

4. A multilayer thin-film structure for use to construct a magnetoresistive device according to claim 2, wherein the uniaxial stress is induced in the multilayer thin-film structure by a substrate on which the multilayer thin-film structure is formed, a protective film formed over the multilayer thin-film structure, a layer insulating film formed in the multilayer thin-film structure or an internal or external force.

5. A multilayer thin-film structure for use to construct a magnetoresistive device according to claim 2, wherein the nonmagnetic layer is formed of Cu, Ag, Au or an alloy of at least two of Cu, Ag and Au.

6. A multilayer thin-film structure for use to construct a magnetoresistive effect device, having at least one layered structure formed by depositing a nonmagnetic layer, a first ferromagnetic layer formed of a ferromagnetic metal or a ferromagnetic alloy having a saturation magnetostriction constant less than $2\times10^{-6}$ in absolute value, a nonmagnetic layer, and a second ferromagnetic layer formed of a ferromagnetic metal or a ferromagnetic alloy having a saturation magnetostriction constant of $2\times10^{-6}$ or above; a uniaxial stress being induced therein.

7. A multilayer thin-film structure for use to construct a magnetoresistive device according to claim 6, wherein the first and the second ferromagnetic layer spaced by the nonmagnetic layer have uniaxial magnetic anisotropy, the respective axes of easy magnetization are perpendicular to each other in a plane including the layers, the uniaxial magnetic anisotropy of the first ferromagnetic layer is controlled during magnetic field film formation or magnetic field heat treatment, the absolute value of the uniaxial magnetic anisotropy energy of the first ferromagnetic layer is in the range of 50 to 500 $J/m^3$, and that of the second ferromagnetic layer is controlled by the magnetoelastic effect of magnetostriction and stress, the absolute value of the second ferromagnetic layer is 500 $J/m^3$ or above.

8. A multilayer thin-film structure for use to construct a magnetoresistive device according to claim 7, wherein the uniaxial stress is induced in the multilayer thin-film structure by a substrate on which the multilayer thin-film structure is formed, a protective film formed over the multilayer thin-film structure, a layer insulating film formed in the multilayer thin-film structure or an internal or external force.

9. A multilayer thin-film structure for use to construct a magnetoresistive device according to claim 7, wherein the nonmagnetic layer is formed of Cu, Ag, Au or an alloy of at least two of Cu, Ag and Au.

10. A multilayer thin-film structure for use to construct a magnetoresistive effect device, comprising: a reference ferromagnetic layer, an antiferromagnetic layer formed on one surface of the reference ferromagnetic layer to establish a single domain in the reference ferromagnetic layer, a nonmagnetic layer formed on the other surface of the reference ferromagnetic layer, and a free ferromagnetic layer formed on the nonmagnetic layer; the direction of spontaneous magnetization of the free ferromagnetic layer being controlled so as to be substantially perpendicular to the magnetization direction of the reference ferromagnetic layer by the magnetoelastic effect produced by the magnetostriction of the free ferromagnetic layer and a uniaxial stress induced in the multilayer thin film structure wherein uniaxial anisotropy energy produced in the free ferromagnetic layer by the magnetostriction of the free ferromagnetic layer and the uniaxial stress induced in the multilayer thin-film structure is greater than the uniaxial anisotropy energy produced in the free ferromagnetic layer during magnetic field film formation and smaller than the anisotropy energy produced in the reference ferromagnetic layer by the antiferromagnetic layer.

11. A multilayer thin-film structure for use to construct a magnetoresistive effect device according to claim 10, wherein the uniaxial stress induced in the multilayer thin-film structure is induced by a substrate on which the multilayer thin-film structure is formed, a protective film formed on the multilayer thin-film structure, a layer insulating layer, or an internal or external force.

12. A multilayer thin-film structure for use to construct a magnetoresistive effect device according to claim 10, wherein the nonmagnetic layer is formed of Cu, Ag, Au or an alloy of at least two of those elements.

* * * * *